Patented Dec. 2, 1930

1,783,592

UNITED STATES PATENT OFFICE

KARL THIESS AND ERNST FISCHER, OF FRANKFORT-ON-THE-MAIN-HOCHST, GERMANY, ASSIGNORS TO GENERAL ANILINE WORKS, INC., OF NEW YORK, N. Y., A CORPORATION OF DELAWARE

VAT DYESTUFF OF THE BENZOTHIONAPHTHENE SERIES

No Drawing. Application filed January 5, 1929, Serial No. 330,610, and in Germany January 26, 1928.

The present invention relates to a vat dyestuff, more particularly it relates to a new vat dyestuff of the thioindigo series which is obtainable by condensing in a solvent, while heating, 5.6-benzo-7-chloro-3-oxy-1-thionaphthene with a reactive α-derivative of 4.5-benzo-3-oxy-1-thionaphthene, for example with an α-anile or α-bromide thereof. Our new dyestuff excels the hitherto known representatives of this class of dyestuffs, especially the condensation products with the isomeric 6.7-benzo-3-oxy-1-thionaphthene, in the fastness to boiling and washing. Moreover the new dyestuff is distinguished by a great dyeing power. The same dyestuff may be obtained by condensing an α-derivative of 5.6-benzo-7-chloro-3-oxy-1-thionaphthene with 4.5-benzo-3-oxy-1-thionaphthene.

The following example illustrates our invention but is not intended to limit it thereto, the parts being by weight.

375 parts of 4.5-benzo-3-oxy-1-thionaphthene-(paradimethylamino)-α-anile are dissolved hot in about fifteen times its weight of glacial acetic acid and filtered. 235 parts of 5.6-benzo-7-chloro-3-oxy-1-thionaphthene, dissolved in the same organic solvent, are then added to the filtrate. After the mass has been boiled in the reflux apparatus for about 2 hours, while continuously stirring, the resulting dyestuff is filtered hot by suction, washed first with glacial acetic acid, then with alcohol and dried.

The dyestuff forms a reddish-brown powder, dissolving in sulfuric acid to a blue solution and dyeing cotton from an orange-brown vat corinth-tints. The dyestuff has the following formula:

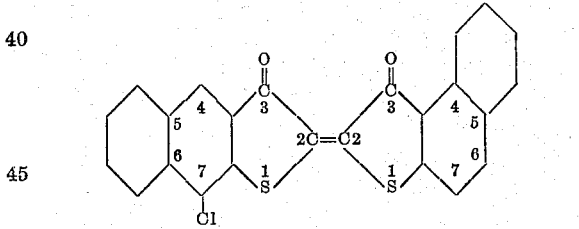

Instead of glacial acetic acid also other organic solvents, as for instance chlorobenzene, may be used.

We claim:
As a new product, the vat dyestuff of the following formula:

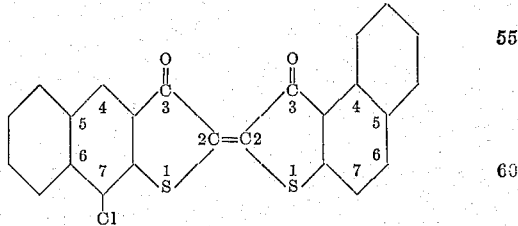

forming a reddish-brown powder, soluble in sulfuric acid to a blue solution and dyeing cotton from an orange-brown vat corinth tints.

In testimony whereof, we affix our signatures.

KARL THIESS.
ERNST FISCHER.